INVENTOR.
EARL L. REEDY

Patented Nov. 11, 1952

2,617,202

UNITED STATES PATENT OFFICE 2,617,202

PROCESS OF CURING AND TREATING LUMBER

Earl L. Reedy, Red Bluff, Calif.

Application August 15, 1949, Serial No. 110,305

3 Claims. (Cl. 34—13.8)

The present invention is particularly adapted for treating and curing what is generally called, Pacific slope black oak (Quercus kelloggii). When cut into boards or planks Pacific slope black oak is a difficult lumber to cure and when cured in the conventional method, it is inclined to check and warp badly, so much so that virgin forests of this lumber have been practically uncut.

When Pacific slope black oak is treated and cured by my method the result is a very fine lumber for which there will be a great demand because it will not warp or check and is suitable for making furniture and for building purposes, hard wood flooring, and trimming.

The basic elements used in my method are time, exposure, mechanical and physical properties, natural laws and rotation. The indirect elements caused through proper application of the direct or basic elements are heating, sweating, fermentation, bacterial and chemical changes, mechanical and physical changes.

Determination of the timing factor is not decided in a matter of hours and minutes only, the time being determined by the mechanical and physical movement of the material at all times. The mechanical and physical movement of the material definitely fixes the time element, depending upon atmospheric or climatic conditions which set a definite rotation of the time and exposure.

Figure 1:
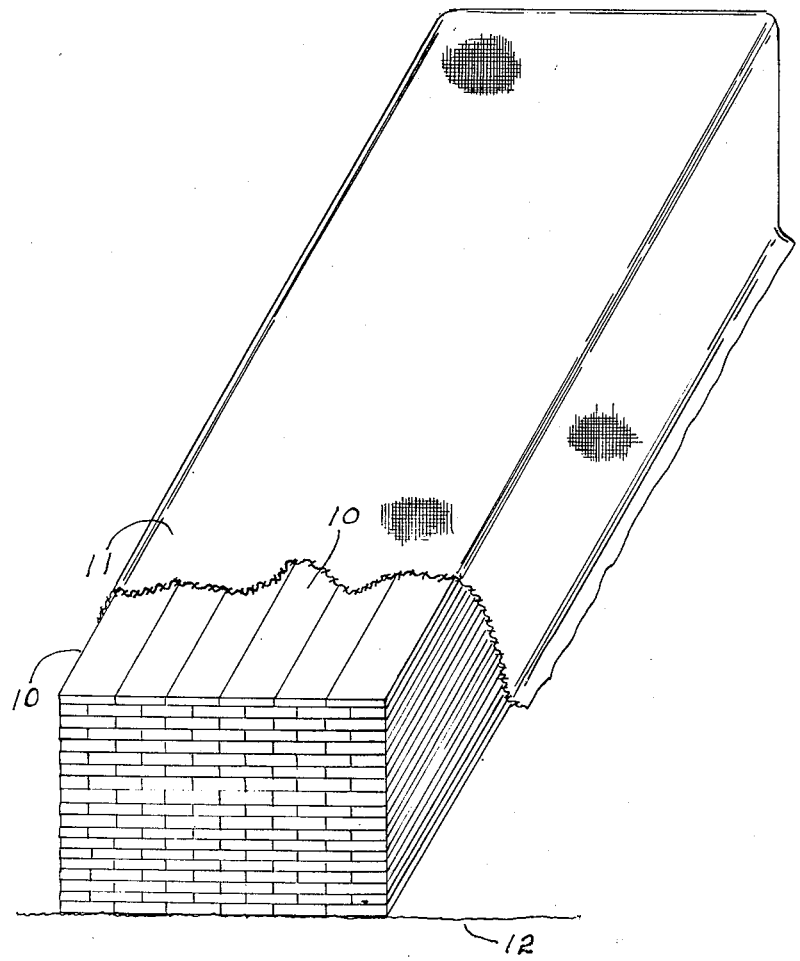
Figure 2:
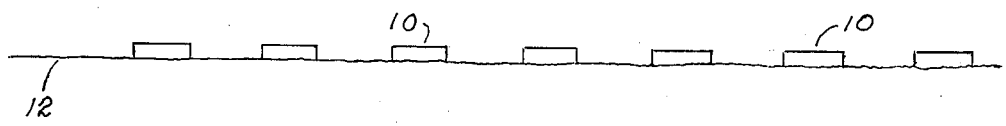

I have for purposes of illustration shown in the drawings, Figures 1 and 2 into which the following procedure can be read.

The first operation in my method is to tight pile the green freshly sawed lumber preferably as shown in Figure 1, in which the boards or planks are designated by reference numeral 10. These piles may be eight or ten feet wide and six or eight feet high and the lumber may be cut in boards or planks in width and thickness suitable for the purpose for which the lumber is to be used.

In the drawings Fig. 1 is an isometric drawing illustrating a pile of lumber for carrying out my invention as being covered preferably by a tarpaulin 11 a fraction being shown cut away or a tarpaulin may be used to cover the top only of the pile. Covering the pile is necessary because it positively prevents checking on the surface of the pile.

Fig. 2 illustrates how the boards or planks are laid on the ground for final treatment.

When the lumber is tightly piled it is heated by natural laws, the heat causing the lumber to go into a sweat which in turn sets off an action of fermentation which then calls for the use of the time element, whereby the fermentation is allowed to reach a certain stage of bacterial and chemical change, namely the breaking down of sugar and cellulose properties. These broken down properties are produced by natural law through the mechanical and physical reaction thrown off by the sweating and by capillary action, a quantity of water, liquids, starches etc., and retaining the more converted plastic like substance using the time element again so as not to allow the process of fermentation to reach the stage of a severe bacterial or chemical change beyond the breaking down of the sugars, cellulose and etc., to a required degree which is determined by a certain loss in weight to where the bacterial count will change causing fungi or other deteriorating bacterial properties causing deterioration or waste.

The object of the tight pile is to create a natural heating and fermentation process, whereby the entire pile is itself under natural laws, starting its reactions at the center of the pile. As this reaction spreads, it reaches each board of the pile, starting from the center.

As the natural reaction progresses through the lumber it sets up what is called the indirect elements of mechanical and physical reaction which in their turn causes the capillary movement of action, thereby causing slight drying and contraction in the center of each piece of wood (also in the entire pile) which in their turn start the capillary movement of the free and saturation liquid in each piece of lumber to gradually move to the outer edges of the individual pieces and likewise to the outer edges of the pile.

The capillary movement of liquids in turn cause a slight saturation of the outer edges of each individual piece while the inner part is acting in the exact reverse (shrinking and drying) with the friction caused by the inside and the outside pulling in opposite directions to set up a succession of opening and closing of the capillary or free water pores, beginning at the center and in an unfolding like manner proceeding to the outer edges of the boards which when completed helps to render the lumber or boards solid and stress free. The capillary movement of the free water causes the lumber to bleed out, reducing its weight at a fast rate. Now this step lasts for (depending on climatic conditions), a period of from three to five days, after which time the pile has to be torn down and the lumber put through the next step.

The second procedure is to expose the lumber to an open air sun treatment as illustrated in Figure 2, whereby the lumber is laid out on the ground surface 12 (not off the ground) one piece in a place as illustrated, leaving space to turn the lumber so as not to lap or cover any piece with the adjacent pieces. The lumber is then turned over substantially every twenty-four hours, depending upon loss of moisture and dimensional measurements. As the lumber is turned it falls on the empty space left for this purpose, so as to lay on ground which has not been covered during the previous exposure. The reason for exposing the pieces of lumber to new ground every twenty-four hours, or for an allotted period, depending upon weather conditions, is done for a specific purpose, namely to benefit by the various properties in the form of heat rays, light rays, violet and ultraviolet rays as follows:

First, taking advantage of the chains of light that penetrate to set up the desired internal changes of the fiber structure of the wood product (also for purification);

Second, taking advantage of the light and heat rays which do not penetrate for the purpose of evaporation, but which in turn cause shrinkage both in size and weight of the wood product exposed and also for purposes of purification.

Third, the use of the new ground for each exposure, is for two distinct purposes, (a) to permit the return through and to the wood product of the combined and changed rays or light chains which have entered the earth by placing the boards or planks flat on clean ground that has been exposed to the sun's rays, and expose the upper sides of the boards or planks to the sun's rays for substantially one day; (b) to subject the change of temperature and humidity to the reversed side of the board slightly increasing the moisture and decreasing the stress of tension, allowing the wood structure to become resilient enough to stretch or give without separating the fibers or breaking the adhesions of the adhesives which hold the structure together, and permitting the top exposed side to once more shrink and tighten through the drying and seasoning caused by evaporation.

The first allotted sun exposure warps a twelve inch board from center out and upward, approximately twelve degrees, at which time the board is reversed bowed side up; repeating the sun exposure until the warp in the board is then reversed past center to approximately ten degrees, thereby making a total warp for the second allotted exposure approximately twenty-two degrees. This process is repeated approximately twenty times, with a gradual decline of warping of each succeeding rotation of exposure, losing an average percent of one degree of warp at each exposure, until generally the end of the twenty day period at which time the board has become flat and stress free, tightly set, and able to withstand further exposure, with negligible mechanical or physical movement.

Also during the allotted time exposure causing the boards to undergo extreme mechanical and physical stress and relief through chemical changes, they gradually lose in size and weight, and shrink in cross measurement approximately one inch to thirteen inches and lose in weight forty percent.

During the sun exposure process, the mechanical movement is caused by tightening the board on the exposed side and stretching the board on the nonexposed side. By correct timing and not allowing the board to warp more than ten or twelve degrees at the beginning while the board is soft and contains considerable moisture, I eliminate the damage of breaking or separating the fiber structure, thereby eliminating checks, or splitting of the boards and decreasing the amount of stress. Each succeeding exposure as the board loses its moisture has a lesser stress or pull effect, while at the same time actually moving the board mechanically and physically in a lesser degree, thereby increasing the tensile, shock and load strength of the board, and increasing the density and gravity of the fiber structure, and at the same time decreasing the size of the board and automatically closing the free water pores to a minimum leaving the board tight, close grained, stress free, free from checks, honeycomb splits or cracks, also free from any further warping under any and all normal conditions.

Clearly the pile of lumber may be large or small within reasonable limits, however the lumber must finally be laid out on the ground as illustrated in Figure 2 and at the proper time and this time element must be observed including careful attention to the pile of lumber during its desired physical change.

It will be seen from the foregoing that my method for treating lumber is very simple; that a man with ordinary intelligence can carry out the method with very few simple instructions, and that the results will always be substantially the same.

Attention is called to the fact that with my system four-quarter lumber can generally be cured within a period of less than thirty days, whereas the standard open air curing method requires from six months to two years, and to kiln dry hardwood lumber it takes from thirty-six hours to three weeks even after it has been air conditioned for a period of six months or longer. The information recited in the next above paragraph connotes that my system of curing lumber is new, novel and less expensive than any known means; furthermore in the standard method there is always a large loss from checking and warping; whereas in my method there is practically no loss from either checking or warping.

Clearly minor detail changes may be made in the method as described and shown without departing from the spirit and scope of the invention as recited in the appended claims; for example it is not absolutely necessary to cover the entire pile of lumber as shown in Figure 1. A cover over the top only of the pile answers except that the ends of the boards may slightly check, therefore I favor covering the entire pile as illustrated.

Having thus shown and described my invention, I claim:

1. A method for curing sawed black oak lumber including, first, closely packing the freshly sawed lumber in a suitably sized pile next, completely cover the pile with tarpaulin, next, leaving the pile undisturbed long enough to go through a sweat and chemical change, next, laying the individual planks in the pile flat on the ground in parallel relation and a distance apart somewhat greater than the width of the planks, next, turning the planks over on new soil and at suitably spaced intervals, whereby the planks are treated to the action of the sun's rays and by the earth from opposite sides simultaneously and for the purpose specified.

2. A method for curing sawed black oak lumber including, first, closely packing the freshly sawed lumber in a pile and completely covering the pile with a tarpaulin or canvas, next, leaving the pile long enough to go through a sweat, next, laying the individual planks flat and a distance apart greater than the width of the planks, next, turning the planks over on new soil and at suitably spaced intervals, whereby the planks are treated to the action of the sun and earth from opposite sides in unison and in spaced apart intervals.

3. A method for curing freshly sawed black oak lumber including, first, closely pack the freshly sawed lumber in a suitably sized pile, next, completely cover said pile with tarpaulin, next, leave the pile undisturbed long enough to go through a sweat, next, laying the individual pieces of lumber from said pile flat on the ground, next, after a predetermined time turn the pieces of lumber over on fresh soil, next, repeat the operation until the lumber is cured, whereby the individual pieces of lumber are treated by the sun's rays and by the earth on opposite sides simultaneously and at spaced apart intervals.

EARL L. REEDY.

REFERENCES CITED

The following references are of record in the file of this patent:

Blake, The Seasoning and Preservation of Timber, 1925, D. Van Nostrand Co., page 29.

Wallis-Taylor, The Preservation of Wood, 1917, William Rider & Son, Ltd., London, page 59.